United States Patent [19]

Baumli

[11] 4,392,913

[45] Jul. 12, 1983

[54] LABELLING APPARATUS

[76] Inventor: Peter J. Baumli, 213 Carrington Rd., Coogee, New South Wales, Australia

[21] Appl. No.: 273,311

[22] Filed: Jun. 15, 1981

[30] Foreign Application Priority Data

Jun. 23, 1980 [AU] Australia ........................ PE4157/80

[51] Int. Cl.[3] ............................................ B32B 35/00

[52] U.S. Cl. .................................. 156/584; 156/497; 156/541; 156/542

[58] Field of Search ............... 156/497, 541, 542, 584; 221/210, 211, 278; 248/363; 271/8 R; 294/65

[56] References Cited

U.S. PATENT DOCUMENTS 3,379,466 4/1968 Hughes ................................ 294/65
3,483,059 12/1969 Dinter ................................ 156/497
3,645,832 2/1972 Sauer .................................. 156/541
3,885,705 5/1975 French ................................ 156/497
3,888,725 6/1975 French ................................ 221/211
3,984,277 10/1976 French et al. ....................... 156/497

*Primary Examiner*—Caleb Weston
*Attorney, Agent, or Firm*—Murray and Whisenhunt

[57] ABSTRACT

A programmable platen for use in a label applying system wherein the labels are transferred to the platen and retained thereby under negative pressure and subsequently driven from the platen by application of positive pressure. The platen comprises a number of pin like valves of differing type which are inserted into the platen in accordance with a desired configuration or program so as to provide the appropriate suction and blowing characteristics for the platen in differing applications for applying labels or the like.

11 Claims, 3 Drawing Figures

LABELLING APPARATUS

The present invention relates to means for positioning and directing a label to a surface to which it is to be adhered.

Various means have been devised for positioning and directing a label onto a surface and in particular for self adhesive and heat seal labels these have operated by means of air pressure. In particular suction has been employed to positively locate a label on a platen or bed such that the label is then forced by positive air pressure toward a surface to which it is to be adhered.

Previous apparatus of this form have comprised a platen or bed having air lines for applying negative or positive pressure to one surface of that platen. The air lines extending from the opposite surface of the platen and each being connected through the platen to a separate orifice on the one surface. The air lines being selectively connected to a source of negative or positive pressure to locate the label on the platen or thrust it off the platen toward a surface to which it is to be adhered.

Such prior art apparatus has been bulky and awkward to use and readjusting the connections to suit different sized labels and different modes of application, e.g. as to whether the label is to be adhered to a curved or flat surface, has been inefficient.

Known forms of label applying arrangements include those of U.S. Pat. No. 3,645,832 and West German patent Nos. 2,412,691; 2,708,353 and 2,727,076.

It is an object of the present invention to provide an improved means for applying and varying positive and negative pressure to a surface of a platen for positioning and directing labels.

In one form the present invention provides a programmable platen for a label applying system comprising a top plate, a bottom plate and a dividing plate therebetween defining two gas chambers, a predetermined arrangement of through bores extending in alignment through said three plates and a plurality of removable valving pins adapted to fit said through bores; each of said chambers being adapted to be coupled to a source of positive or negative gas pressure such that the manner in which each through bore location on the top plate is subject to positive and/or negative pressure is dependant upon the absence of a valving pin or the form of valving pin associated with each through bore in accordance with a predetermined programme for arranging said valving pins.

The present invention will now be described by way of example with reference to the accompanying drawings, in which.

Figure 1:
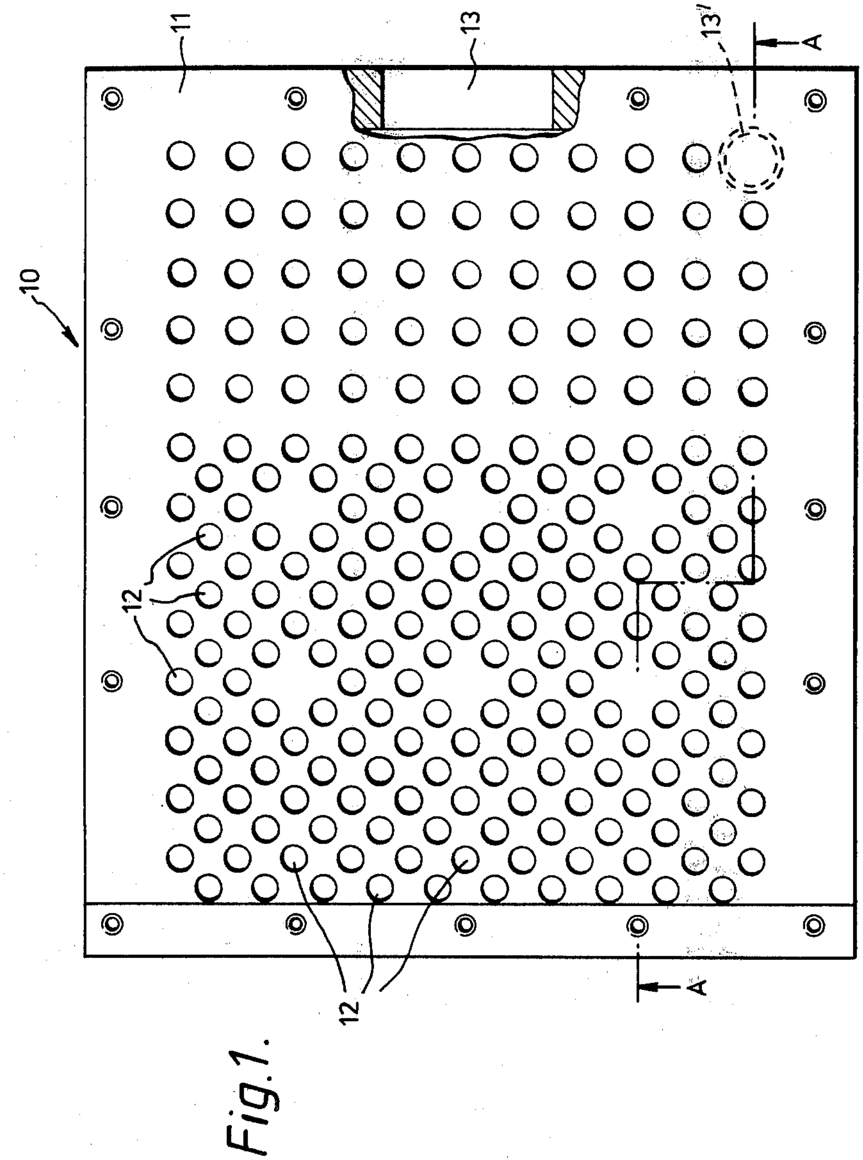
FIG. 1 is a plan view of a platen in accordance with the present invention.

Referring to FIG. 1 there is shown a platen 10 comprised of a top plate 11 and having a plurality of through bores 12 thereon. In cutaway is shown an inlet 13 for a source of vacuum and dashed lines showing an inlet 13′ for a source of positive air pressure. The arrangement of bores 12 can be as desired for any particular application or located so as to be suitable for various different applications depending upon sizes of labels and modes of application.

Figure 2:
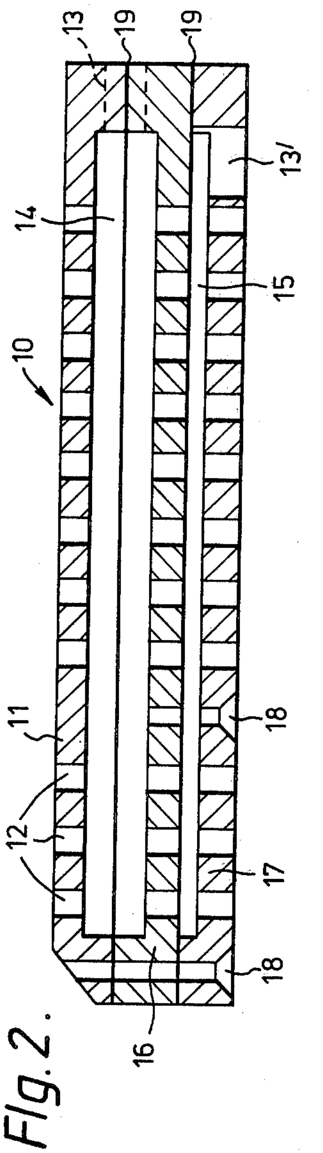
FIG. 2 is a sectional view A—A of FIG. 1 not detailing the through bores.

FIG. 2 shows chambers 14 and 15 with chamber 14 adapted for connection to a source of vacuum and chamber 15 adapted for connection to a source of positive air pressure. The chambers being bounded by top plate 11, middle plate 16 and bottom plate 17 and secured together by screws 18 with gaskets 19 therebetween.

Figure 3:
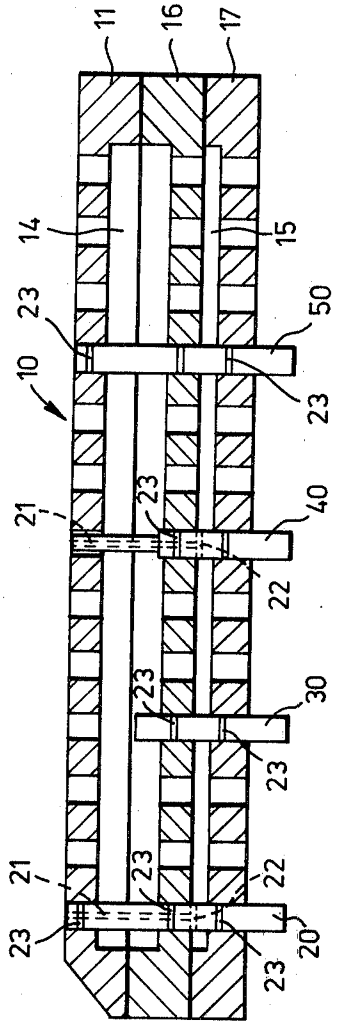
FIG. 3 is a sectional view A—A of FIG. 1 showing the through bores as well as four different types of valving pins suitable for use with the platen.

Referring now to FIG. 3 there is shown the arrangement of plates chambers and through bores in association with four different types of valving pin.

Pin 20 is an air pin in that it comprises a central bore 21 which communicates through transverse bore 22 with air chamber 15. When a positive air pressure exists in chamber 15 a blast of air is transmitted through bores 22 and 21 to the surface of the top plate 11. O-rings 23 function to provide gas tight seals between the pin 20 and its associated through bore in plates 11, 16 and 17. In an alternative form pins 20, 30, 40 and 50 are formed by plastics moulding. Preferably, the gas tight seals 23 are integrally formed with the moulding of each pin section. Suitable plastics materials for moulding the pins include PVC.

Pin 30 is a solid pin and can be termed a vacuum pin as it acts to seal its associated through bore from communication with air chamber 15. In this way when a negative pressure exists in chamber 14 it is applied to the surface of the top plate 11 via the bore with which pin 30 is associated whereas when a positive pressure exists in chamber 15 it is not applied to the top plate 11 which is sealed from communication by pin 30.

Pin 40 is similar to the preceding types but is a composite pin in that it serves to apply vacuum and positive pressure to the top plate at the one position. Pin 50 is a blind pin and acts to seal the top plate at its through bore position from both vacuum and positive pressure. Each of the pins project below bottom plate 17 so that a programmer can readily remove and replace them in any desired arrangement.

In operation a label is dispensed toward the top plate 11 of the platen which is acted upon by a vacuum through a predetermined pin arrangement. This vacuum holds the label in place until it is ready for application to an object whereupon positive pressure is applied to the label to drive it toward the object. The positive pressure may be achieved by overcoming the vacuum which is maintained constant or by switching off the vacuum and applying positive pressure to chamber 15. Thereafter a further label may be dispensed for retention by the platen until it is required for application to an object.

In the case of self-adhesive or other labels it may be necessary to provide air assistance for accurate positioning of the label on the platen. Such air assistance being suitably provided by an air blast nozzle acting on a label as it is separated from a support sheet.

The example of the depicted embodiment shows a flat bed platen but it will be apparent that the platen may be shaped as required for different applications.

It will be understood that the present invention is not limited by the particular features of the preferred form of the invention as described as many modifications and variations are possible within the scope of the brodest form of the invention.

I claim:

1. A programmable platen for a label applying system comprising a top plate, a bottom plate and a dividing plate therebetween defining two gas chambers, a predetermined arrangement of through bores extending in alignment through said three plates and a plurality of removable valving pins adapted to fit said through bores; each of said chambers being adapted to be coupled to a source of positive or negative gas pressure and wherein the surface of the platen at each valving pin location is subject to positive and/or negative pressure depending upon the form of valving pin fitted in each through bore in accordance with a predetermined program for arranging said valving pins; each valving pin extending between at least two of said plates and having gas sealing means between said pin and at least two of said plates.

2. A programmable platen as claimed in claim 1 wherein at least two of the valving pins fitted to said platen differ from each other.

3. A programmable platen as claimed in claim 1 wherein at least four of the valving pins fitted to said platen differ from each other.

4. A programmable platen as claimed in claim 1 wherein the valving pins are formed from plastics material.

5. A programmable platen as claimed in claim 4 wherein the gas sealing means are integrally formed in the plastics valving pins.

6. A programmable platen as claimed in claim 1 wherein said valving pins comprise a first solid pin extending from the bottom plate to the top plate through the dividing plate and having gas sealing means between said first pin and each of said plates.

7. A programmable platen as claimed in claim 1 wherein said valving pins comprise a second solid pin extending from the bottom plate to the dividing plate and having gas sealing means between said second pin and each of said bottom and dividing plates.

8. A programmable platen as claimed in claim 1 wherein said valving pins comprise a third pin extending from the bottom plate to the top plate through the dividing plate and having gas sealing means between said third pin and each of said plates, said third pin further comprising internal passage means connecting one of said two gas chambers with the surface of said top plate when said third pin is in situ.

9. A programmable plated as claimed in claim 1 comprising a fourth pin extendable from the bottom plate to the top plate through the dividing plate and having gas sealing means between said fourth pin and each of said bottom and dividing plates only, said fourth pin further comprising internal passage means connecting the gas chamber formed between said bottom and dividing plates with the surface of said top plate when the fourth pin is in situ.

10. A programmable platen as claimed in claims 6, 7, 8, or 9 wherein said gas sealing means are O-rings.

11. A programmable platen as claimed in claim 3, wherein said at least four forms of the valving pins include at least one solid pin extending from the bottom plate to the top plate through the dividing plate and having gas sealing means between said first pin and each of said plates, at least one second solid pin extending from the bottom plate to the dividing plate and having gas sealing means between said second pin and each of said bottom and dividing plates, at least one third pin extending from the bottom plate to the top plate through the dividing plate and having gas sealing means between said third pin and each of said plates, said third pin further comprising internal passage means connecting one of said two gas chambers with the surface of said top plate when the said third pin is in situ, and at least one fourth pin extending from the bottom plate to the top plate through the dividing plate and having gas sealing means between said fourth pin and each of said bottom and dividing plates only, said fourth pin further comprising internal passage means connecting the gas chamber formed between said bottom and dividing plates with the surface of said top plate when the fourth pin is in situ.

* * * * *